US009275060B1

(12) United States Patent
Supekar

(10) Patent No.: US 9,275,060 B1
(45) Date of Patent: Mar. 1, 2016

(54) METHOD AND SYSTEM FOR USING HIGH AVAILABILITY ATTRIBUTES TO DEFINE DATA PROTECTION PLANS

(75) Inventor: Nitin Supekar, Pune (IN)

(73) Assignee: Symantec Corporation, Mountain View, CA (US)

( * ) Notice: Subject to any disclaimer, the term of this patent is extended or adjusted under 35 U.S.C. 154(b) by 435 days.

(21) Appl. No.: 13/360,493

(22) Filed: Jan. 27, 2012

(51) Int. Cl.
*G06F 17/30* (2006.01)
*G06F 7/00* (2006.01)

(52) U.S. Cl.
CPC .... *G06F 17/30082* (2013.01); *G06F 17/30221* (2013.01)

(58) Field of Classification Search
CPC ................... G06F 17/30073; G06F 17/30082; G06F 17/30085; G06F 17/30221
See application file for complete search history.

(56) References Cited

U.S. PATENT DOCUMENTS

| 7,451,201 | B2* | 11/2008 | Alex et al. ..................... 709/223 |
| 7,613,747 | B1* | 11/2009 | Thakur et al. ................. 707/640 |
| 7,693,889 | B1* | 4/2010 | Armorer et al. .............. 707/653 |
| 7,734,954 | B2* | 6/2010 | Davis et al. ..................... 714/15 |
| 8,195,976 | B2* | 6/2012 | Rao et al. ....................... 714/4.1 |
| 8,306,951 | B2* | 11/2012 | Ghosh et al. .................. 707/646 |
| 2005/0071391 | A1* | 3/2005 | Fuerderer et al. ............. 707/204 |
| 2007/0271304 | A1* | 11/2007 | Atluri ........................... 707/200 |
| 2008/0162843 | A1* | 7/2008 | Davis et al. .................... 711/162 |
| 2010/0169860 | A1* | 7/2010 | Biazetti et al. ................ 717/107 |
| 2012/0117029 | A1* | 5/2012 | Gold ............................. 707/651 |
| 2013/0042139 | A1* | 2/2013 | Bhalerao et al. .................. 714/2 |

* cited by examiner

*Primary Examiner* — Jeffrey A Burke
(74) *Attorney, Agent, or Firm* — Wilmer Cutler Pickering Hale and Dorr LLP

(57) ABSTRACT

A data protection agent or server running on a computing device receives a cluster configuration of a high availability cluster. The data protection agent or server identifies highly available data of an application running on the high availability cluster based on the clustering. The data protection agent or server then implements a data protection policy that backs up the highly available data.

19 Claims, 8 Drawing Sheets

METHOD AND SYSTEM FOR USING HIGH AVAILABILITY ATTRIBUTES TO DEFINE DATA PROTECTION PLANS

FIELD OF THE INVENTION

Embodiments of the invention relate to the field of data backup, and more particularly to using cluster configuration data from a high availability cluster to set backup policies.

BACKGROUND OF THE INVENTION

Many enterprises have important data that should be backed up for business reasons and/or compliance reasons. For example, there are compliance guidelines under the Health Insurance Portability and Accountability Act (HIPAA) to preserve records of complaint for 6 years, to preserve certain billing records for 6 years, to retain medical records for 5 years, and so forth. To back up and protect such data, enterprises typically deploy enterprise data protection systems. These systems periodically generate backup copies of specified data, and write the backup copies to backup storage devices.

Data protection systems are typically set up and maintained by information technology (IT) administrators (often called backup administrators). Such IT administrators do not typically have detailed knowledge about the systems for which they are to backup data. Accordingly, it can be difficult and time consuming for an IT administrator to set up protection policies to backup data for enterprise systems. Often, the IT administrator will need to coordinate with a system administrator who manages the system that is to be backed up to determine what data from the system to protect. This can further consume enterprise resources and slow down the process of setting up protection policies. Moreover, this can result in backup policies that do not protect sensitive data. Additionally, enterprise systems are dynamic in nature. Therefore, even if an IT administrator sets up a data protection policy correctly, that data protection policy may stop protecting important data in the future unless the IT administrator correctly modifies the policy.

SUMMARY OF THE INVENTION

In one embodiment, a data protection agent or server running on a computing device receives a cluster configuration of a high availability cluster. The data protection agent or server identifies highly available data of an application running on the high availability cluster based on the cluster configuration. The data protection agent or server then implements a data protection policy to back up the highly available data. In one embodiment, the computing device is a node in the high availability cluster, and the data protection agent or server backs up the highly available data to a storage device at a time specified in the data protection policy.

In one embodiment, the application is a multi-tiered application having at least a first tier and a second tier that is depended on by the first tier, and the data protection agent or server quiets the first tier and second tier before backing up the highly available data. Quieting the first tier may comprise blocking access to the first tier and performing at least one of writing contents of a first memory at the first tier to a first permanent storage or sending the contents of the first memory to the second tier. Quieting the second tier may comprise writing contents of a second memory at the second tier to at least one of the first permanent storage or a second permanent storage. In one embodiment, the multi-tiered application comprises a web server tier corresponding to the first tier, an application server tier corresponding to the second tier and a database tier.

In one embodiment, the highly available data is for a multi-tiered application having at least a first tier and a second tier that is depended on by the first tier. In such an embodiment, the backup agent or backup server may identify a first subset of the highly available data associated with the first tier and a second subset of the highly available data associated with the second tier. The backup agent or server may record in metadata that the first subset is associated with the first tier and that the second subset is associated with the second tier. The backup agent or server may additionally store the first subset, the second subset and the metadata in a backup storage device. In one embodiment, the backup agent or server recovers the application, the recovery comprising recovering the second tier based on the second subset, and subsequently recovering the first tier based on the first subset.

In one embodiment, the backup agent or server identifies, based on the cluster configuration, a primary server and a standby server of the highly available cluster. The backup agent or server then backs up the highly available data from the standby server without interrupting operations of the primary server. In one embodiment, backing up the highly available data from the standby server comprises determining that the standby server has received a point-in-time image from the primary server, the point-in-time image containing the highly available data, and generating a backup of the point-in-time image. In one embodiment, the backup agent or server queries the high availability cluster for the cluster configuration via at least one of a command line interface of the high availability cluster, a web service of the high availability cluster or an application programming interface of the high availability cluster.

In additional embodiments, methods for performing the operations of the above described embodiments are also implemented. Additionally, in embodiments of the present invention, a computer readable storage media stores methods for performing the operations of the above described embodiments.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1A:
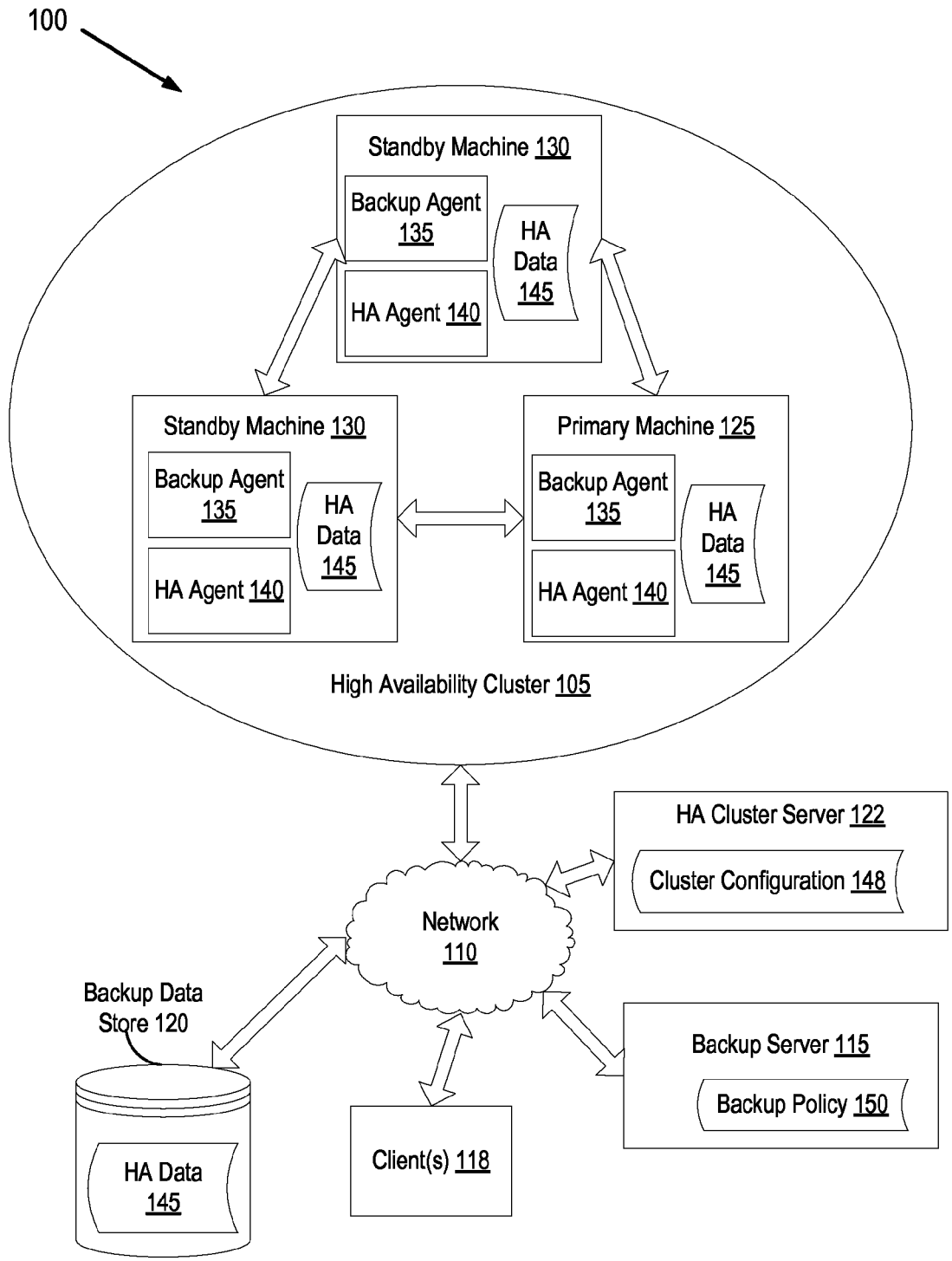
FIG. 1A illustrates an exemplary network architecture, in which embodiments of the present application may operate.

A method and apparatus for setting up and implementing data protection policies (also referred to herein as backup policies) based on cluster configuration data for a high availability cluster are described. A backup agent or backup server receives a cluster configuration, determines highly available data from the cluster configuration, and generates a backup policy that protects the highly available data. As used herein, highly available data is data that is stored on a data store that is highly available, and that will be available even if a primary node fails or becomes unresponsive. Such a data store may be a shared data store that is shared between nodes in a cluster and/or may be a replicated data store of which multiple nodes have a copy. The backup agent or server then backs up the highly available data according to the backup policy.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "identifying", "implementing", "quieting", "recording," "storing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Embodiments of the present invention can automatically identify enterprise assets such as data to protect based on a cluster configuration. The cluster configuration may be provided by a high availability cluster agent or service. Data that is made highly available via the high availability cluster may be identified as important data. Accordingly, a backup agent or server may set up a data protection policy to backup such highly available data. Thus, embodiments of the present invention can either automatically set up backup policies or provide a backup administrator with information that enables him to set up backup policies. Embodiments of the present invention may simplify and speed up the process of setting up backup policies.

FIG. 1A illustrates an exemplary network architecture 100, in which embodiments of the present application may operate. The network architecture 100 includes a high availability cluster 105 connected to a backup data store 120, clients 118, a high availability server 122 and/or a backup server 115 via a network 110. The network 110 may be a public network (e.g., the Internet), a private network (e.g., a local area network (LAN) or wide area network (WAN)), or a combination of a public network and private network. Network 110 may be the network of an enterprise (e.g., a corporation), and may also include such devices as network printers, switches, routers, gateways, firewalls, or any other devices having a network address. Note that a primary machine 125 and standby machines 130 included in the high availability cluster 105 may also be connected with one another via network 110 or via another network.

The high availability cluster 105 includes multiple machines, which may be classified as primary machines 125 and as standby machines 130. Primary machines 125 and standby machines 130 may include one or more computing devices such as, for example, a desktop computer, laptop computer, server computer, etc. configured to perform designated tasks. Primary machines 125 and standby machines 130 may include one or more processing devices, memory, data stores, etc. In one embodiment, primary machines 125 and/or standby machines 130 are virtual machines that run on top of hosts executing hypervisors. In one embodiment, the high availability cluster 105 executes inside a cloud managed by a cloud provider system (not shown). In such an embodiment, the standby machines 130 and primary machines 125 may be virtual machines hosted on physical machines provided by the cloud provider.

The high availability cluster 105 may include one or multiple active primary machines 125 that may receive requests from clients 118, process the requests and/or perform other operations. The high availability cluster 105 may also include one or more standby machines 130. The standby machines 130 may have a system state that is synchronized with a system state of the primary machine (or machines) 125, but may not perform any work. Standby machines 130 and primary machines 125 may be virtually identical, except that the primary machine 125 is active while the standby machines 130 are in a standby state. The standby machines 130 may be ready to assume work performed by the primary machine 125 at any time. For example, if the primary machine crashes or becomes unreachable (e.g., due to a network partition), then the high availability cluster 105 may fail over to a standby machine 130.

Primary machines 125 and standby machines 130 may host copies of an enterprise application that provides services to clients 118 on network 120. Examples of enterprise application include storage applications that provide network storage, email applications that handle incoming and outgoing email traffic, web applications, databases, and so forth. The enterprise application may generate and use data that may be important to the enterprise. The data may include, for example, emails, transaction information, patient information, web server data such as web pages, customer information, etc.

In one embodiment, each machine 125, 130 includes a high availability agent 140 that performs operations with regards to load balancing, synchronizing a state between machines 125, 130, and so forth. The high availability (HA) agents may communicate with each other and/or with high availability server 122 to maintain the high availability cluster 105. In one embodiment, the high availability agents 140 maintain the cluster 105 based on a cluster configuration 148. The cluster configuration 148 may specify what data to replicate between the primary machine 125 and standby machines 130, how and when to failover from the primary machine 125 to a standby machine 130, how many primary machines 125 and how many standby machines 130 to maintain, and so forth.

In one embodiment, high availability server 122 manages the high availability cluster 105. HA server 122 may include one or more computing devices such as, for example, a desktop computer, laptop computer, server computer, etc. configured to perform designated tasks. HA server 122 may include one or more processing devices, memory, data stores, etc. HA server 122 may generate the cluster configuration 148, instantiate the primary and standby machines, and perform other management tasks. Alternatively, management of the high availability cluster 105 may be performed through consensus by high availability agents 140 running on the machines 125, 130 in the high availability cluster 105. Accordingly, in some embodiments high availability server 122 may not be present.

In one embodiment, standby machines 130 and/or primary machines 125 include backup agents 135. Backup agents 135 may facilitate and/or perform the backup of high availability data 145 or other data to backup data store 120. Backup data store 120 may be or include hard disk drives (e.g., arranged in a storage area network (SAN) or network attached storage (NAS)), tape backup, a cloud data store, etc. Backup agents 135 may coordinate with backup server 115 to backup data.

Backup server 115 may be an enterprise class online backup system such as provided by Barracuda Networks®, IronMountain®, CoreVault®, Rackspace®, Amazon Simple Storage Service (S3)®, and so on. Alternatively, the backup server 115 may be a corporate managed backup system that backs up data items to backup data store 120 controlled by the corporation whose data is being protected. Examples of such corporate backup systems include Symantec® Backup Exec®, Symantec NetBackup®, EMC Networker®, IBM Tivoli Storage Manager®, and so on. Backup server 115 may include one or more computing devices such as, for example, a desktop computer, laptop computer, server computer, etc. configured to perform designated tasks. Backup server 115 may include one or more processing devices, memory, data stores, etc.

Different corporate backup systems may use various combinations of backup agents 135, backup server 115, network appliances, and so forth. Backup agents 135 and/or backup server 115 backup high availability data according to a backup policy 150. In one embodiment, the backup policy 150 is generated by backup server 115 and transmitted to backup agents 135. Alternatively, the backup policy 150 may be generated by a backup agent 135 and sent to other backup agents 135. In one embodiment, the backup server and/or backup agent 135 generates the backup policy based on information from the cluster configuration 148. The cluster configuration 148 may identify what data used by the high availability cluster is made highly available. For example, the cluster configuration 148 may show that a shared disk or file system is used to store data for the high availability cluster 105. The backup policy 150 may backup data stored to the shared disk or file system. In another example, an Oracle® server may have multiple database instances running, and only one of those database instances may be made highly available. The backup policy 150 may backup data stored at the highly available Oracle database instance, but not data stored at the other Oracle database instances. Alternatively, the backup policy 150 may backup all of the database instances, but give higher priority to the database instance that is made highly available. The backup policy 150 may backup the high availability data to a faster backup store, may maintain a higher retention level for the high availability data, may create more backup copies of high availability data and/or may use a higher backup job priority for high availability data. In another example, a file server may have a C drive, a D drive and an E drive, and the clustering configuration may show that just the D drive is highly available (e.g., that the D drive is replicated to standby machines 130). The backup policy 150 may backup data stored at the D drive, but not data stored at the C and E drives. Alternatively, the backup policy 150 may backup data stored at the C, D and E drives, but may assign a higher priority to the D drive, maintain high redundancy for backup data from the D drive, may backup the D drive more quickly and/or more frequently, etc.

In one embodiment, the backup server 115 and/or backup agent 135 generates a backup policy 150 that protects highly available data 145. Highly available data (also referred to herein as availability data) 145 may be any data that an administrator has determined to be important enough to make highly available. Possible examples of such high availability data 145 include email data, customer data, patient data, transaction data, web site data, etc.

In one embodiment, backup agents 135 and/or the backup server 115 backup high availability data 145 from a standby machine 130 without interrupting operations of the primary machine 125. Since the standby machines 130 are synchronized to the primary machine 125, backing up from a standby machine 130 provides a consistent copy of a state of the application and/or of the high availability data 145. In one embodiment, the HA agent 140 on the primary machine 125 periodically takes a snapshot (a point-in-time image) of the state of the application at the primary machine, including the state of the high availability data 145, and sends this snapshot to the high availability agents 140 on the standby machines 130. In response to a standby machine 130 receiving the snapshot, the backup agent 135 (or the backup server 115) may backup a copy of the snapshot (or a portion of the snapshot) to backup data store 120. To enable such a backup policy that takes advantage of synchronization between the primary machine 125 and the standby machines 130, the backup agents 135 and/or backup server 115 should have information identifying the primary machine 125 and the standby machines 130. Specifically, backup agents 135 and/or backup server 115 may have information about storage devices used to store primary data and also other storage devices that host replicated data. For a backup policy 150 to take advantage of such an architecture, knowledge of both these storage devices may help the generation of the policy. This information may be included in and/or derived from the cluster configuration 148.

In one embodiment, backup agents 135 running on standby machines 130 and/or primary machines 125 perform backup independent of backup server 115 or any remote backup system. In such an embodiment, backup agents 135 may backup data to backup data store 120 without communicating with backup server 115. In another embodiment, backup is performed without use of backup agents 135. For example, backup server 115 may access high availability data 145 on standby machines 130 and/or primary machines 125 without use of a backup agent 135.

Clients 118 may be laptop computers, desktop computers, mobile phones, personal digital assistants (PDAs), notebook computers, tablet computers, server computers, or other computing devices connected to network 120. Clients 118 include applications (not shown) that access, request operations from and/or query machines of high availability cluster 105. Examples of applications include an email application (e.g., Microsoft Outlook, Mozilla Thunderbird, Apple Mail, etc.), an instant messaging application (e.g., Yahoo Instant Messenger, Windows Live Messenger, ICQ, etc.), a web browser (e.g., Google Chrome, Microsoft Internet Explorer, Apple Safari, etc.), and so on.

Figure 1B:
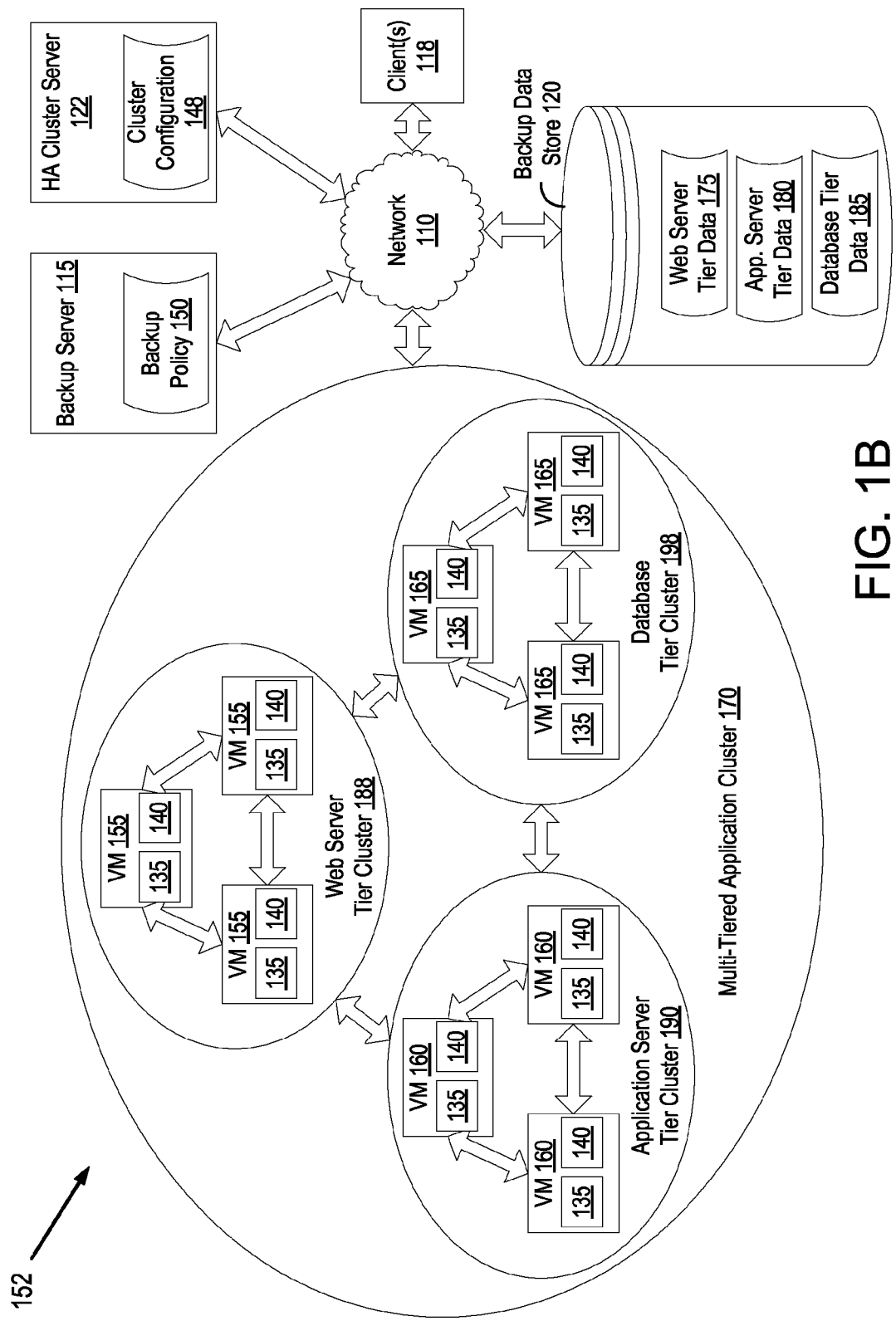
FIG. 1B illustrates another exemplary network architecture, in which embodiments of the present application may operate.

FIG. 1B illustrates another exemplary network architecture 152, in which embodiments of the present application may operate. The network architecture 152 includes a multi-tiered application cluster 170 connected to a backup data store 120, clients 118, a high availability server 122 and/or a backup server 115 via a network 110. The multi-tiered application cluster 170 maintains high availability for a multi-tiered application. The multi-tiered application includes multiple systems (e.g., a web server, application server and database in the case of a web common based application) acting together to form a single application. Other examples of multi-tier applications that support a multi-tier architecture or have multiple systems cooperating to deliver certain functionality or services include backup systems and archival systems. Other non-web based multi-tier applications may also be used, which may not have a web server tier. Each of the different tiers may have different operating systems, different versions of operating systems, different applications, different data, and so forth. The network 110 may be a public network (e.g., the Internet), a private network (e.g., a local area network (LAN) or wide area network (WAN)), or a combination of a public network and private network.

The multi-tiered application cluster 170 is a cluster of clusters that is maintained by high availability agents 140 and/or a high availability server 122. The high available agents 140 and/or high availability server 122 may be, for example, components of Symantec's Virtual Business Service (VBS)® cluster system, or another clustering solution that allows for multi-tiered clustering. Each of the clusters may correspond to a different tier or layer of a multi-layer application. Most web applications typically implement multiple layers or tiers of functionality to operate. For example, a common web application may use a database tier, an application server tier and the actual web server tier. Components within each of these tiers may have their own resource preferences, dependencies, and so forth. Additionally, these components may operate on a single machine or may operate on different machines. Accordingly, in one embodiment, the multi-tiered application cluster 170 includes a web server tier cluster 105, an application server tier cluster 190 and a database tier cluster 198. Each of these clusters 188, 190, 198 may include a different collection of machines that provide a particular service or functionality. Note that in alternative embodiments, other multi-tiered application clusters may be used, which may have more, fewer, or different tiers than those illustrated.

Web server tier cluster 188 may include a collection of linked virtual machines 155 (or physical machines), each of which may include a copy of a web server configured to serve files such as web pages to clients 118. Application server tier cluster 190 may include a collection of linked virtual machines 160 (or physical machines), each of which may include software that provides services for developing, deploying and/or managing applications in a distributed manner. The application servers may also include application code for executing business logic for services such as email, searching, electronic commerce, etc. Database tier cluster 198 may include a collection of linked virtual machines 165 (or physical machines), each of which may include a copy of a database and/or a database server.

High availability agents 140 running on virtual machines 155, 160, 165 may communicate with other high availability agents 140 running on virtual machines in the same tier cluster and/or with high availability agents 140 running on virtual machines in other tier clusters. A cluster configuration 148 may identify the relationships and dependencies between the different tier clusters as well as relationships within tier clusters. For example, the cluster configuration 148 may indicate that the web server tier cluster 188 depends on the application server tier cluster 190, and that the application server tier cluster 190 depends on the database tier cluster 198. The cluster configuration 148 may therefore provide a topology of multi-tiered assets, which may be defined as multiple different clusters, and which together form a larger cluster.

Conventional data backup systems do not protect multi-tiered applications as a single asset. For example, conventional data backup systems would create separate backups of data from the web server tier, from the application server tier and from the database tier, without any information on how these backups relate to one another. It can therefore be difficult for a backup administrator to reconstruct a multi-tiered application during recovery of a multi-tiered application.

In contrast, embodiments of the present invention provide a backup system (e.g., backup agents 135 and/or backup server 115) that can protect the multi-tiered application as a single asset. Backup agents 135 running on the virtual machines 155, 160, 165 and/or a backup server 115 may generate and implement a backup policy 150 that protects highly available data from some or all of the tier clusters 188, 190, 198, and that maintains relationships between these tiers. For example, a backup policy 150 may be set up that protects highly available data from the web server tier 175, that protects highly available data from the application server tier 180, and that protects highly available data from the database tier 185. Backup agents 135 and/or backup server 115 may backup data from multiple tiers as a single image or as separate and distinct images. Backed up data may include metadata that identifies which tier the backup data is associated with and/or how the backup data relates to backup data from other tiers. For example, the metadata may identify associations and/or dependencies between the backup data from the different tiers of a multi-tier application. Accordingly, the backup agents 135 and/or backup server 115 may restore a complex multi-tiered application from the backed up data.

In one embodiment, in order to generate a consistent backup for the different tiers, the backup system (e.g., backup agents 135 and/or backup server 115) performs a multi-step backup. Initially, the backup system may quiet (also referred to as quiesce) the web server tier (or other top level tier that is not depended upon by any other tier). Quieting or quiescing the web server tier may include processing all pending requests to the web server tier and blocking any additional accesses and/or requests to the web server tier (e.g., by clients 118). Quieting the web server tier may further include writing a memory of the web server tier to permanent storage, to a memory of the application server tier and/or to a memory of the database tier. Once the web server tier is quieted, the backup system may quiet the application server tier (or a next tier that the previously quieted tier depends on). Quieting the application server tier may include writing contents of the application server tier's memory to permanent storage and/or to a memory of the database tier. Once the application server tier is quieted, the backup system may quiet the database tier. Quieting the database tier may include writing data from the database tier's memory to permanent storage. Once all tiers have been quieted, the backup system may write web server tier data 175 from permanent storage of the web server tier to the backup data store 120, application server tier data 180 from permanent storage of the application server tier to backup data store 120 and/or database tier data 185 from permanent storage of the database tier to backup data store 120. Note that in many cases there will be no data to back up from the web server tier.

Figure 2:
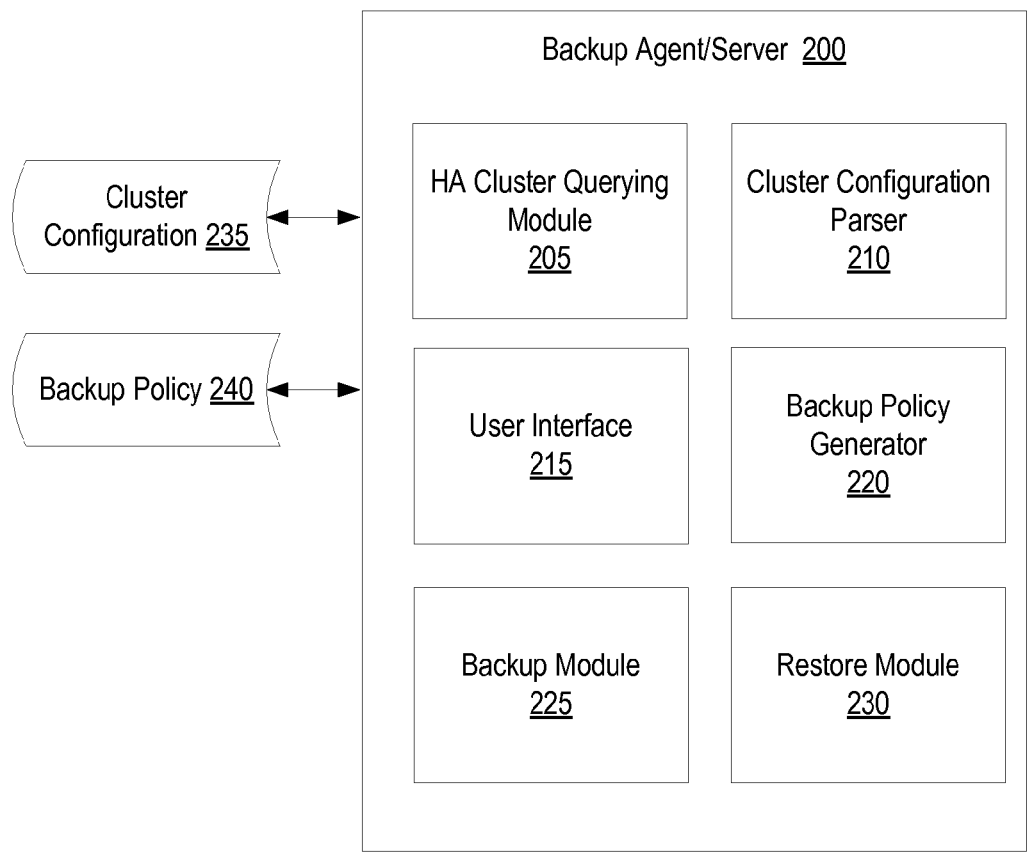
FIG. 2 is a block diagram of a backup agent or backup server, in accordance with one embodiment of the present invention.

FIG. 2 is a block diagram of a backup agent and/or backup server 200, in accordance with one embodiment of the present invention. In one embodiment, backup agent/server 200 corresponds to backup agent 135 and/or backup server 115 of FIGS. 1A-1B. In one embodiment, backup agent/server 200 includes high availability cluster querying module 205, a cluster configuration parser 210, a user interface 215, a backup policy generator 220, a backup module 225 and a restore module 230. In other embodiments, the functionality of these modules may be further divided into additional modules, or the functionality of multiple modules may be combined into a single module. Also, as previously described, backup policies may be configured, and backups may be performed, using backup agents, using a backup server, or using a combination of backup agents and a backup server. Accordingly, the high availability cluster querying module 205, cluster configuration parser 210, user interface 215, backup policy generator 220, backup module 225 and restore module 230 may all be included in a backup agent and/or may all be included in a backup server. Alternatively, some of these modules may be divided between a backup agent and a backup server. Further discussion of FIG. 2 will be discussed with regards to a backup agent 200. However, it should be understood that any of the described functionality may also be performed by a backup server 200 or a combination of a backup agent (or agents) and a backup server.

High availability cluster querying module 205 queries a high availability cluster for a cluster configuration 235. High availability cluster querying module 205 may query a high availability agent or a high availability server via a command line interface, a web service and/or an application programming interface (API) of the high availability agent or high availability server to obtain the cluster configuration.

Cluster configuration parser 210 parses the received cluster configuration 235 to determine what data is made highly available by the cluster configuration 235. The cluster configuration 235 may provide a topology of a high availability cluster, including numbers of active and standby servers, fault tolerance policies, failover policies, load balancing policies, and so forth. The cluster configuration may further identify data that is made highly available. If the cluster configuration 235 is for a multi-tiered application cluster, then the cluster configuration 235 may also indicate relationships and dependencies between the different tiers, start order for the different tiers, stop order for the different tiers, etc.

Backup policy generator 220 generates a backup policy 240 to protect the identified highly available data. Backup policy generator 220 may automatically set up a backup policy 240 based on the information from the cluster configuration 235 without receiving any user input. Alternatively, backup policy generator 220 may identify highly available data to a backup administrator to enable the backup administrator to set up a backup policy 240. In such an instance, the backup policy 240 may be generated based on user input.

Backup administrators typically know where to back up data to, and when to back up data, but typically do not know what data to back up. For example, in a system with multiple different database instances running, a backup administrator does not typically know what is inside of the different databases, and therefore does not know which of the database instances to back up. However, the backup policy generator 220 can provide such information to the backup administrator, or can automatically set up backup policies for the backup administrator that backup highly available data. A backup policy may include information specifying where to backup data to (e.g., to a disk drive, NAS, SAN, tape backup, cloud storage, etc.), when to backup data (e.g., a backup schedule such as every 10 minutes, every night at midnight, on weekends, etc.), and what data to backup (e.g., data from a particular share drive, database, file folder, storage device, etc.).

Backup module 225 performs backups of highly available data in accordance with the backup policy 240. At specified times (e.g., every hour), backup module 225 generates a copy of the highly available data, and writes this copy to a backup data store. In one embodiment, the copy of the highly available data is a snapshot or point-in-time image. In one embodiment, the copy is recorded as a delta from a previous copy of the highly available data.

Restore module 230 restores an application to a previous state based on a previously generated backup. In one embodiment, the previously generated backup is for a multi-tiered application, and the backup data includes data from multiple tiers. In such an embodiment, restore module 230 may restore data for the different tiers in an appropriate order to maintain consistency. In one embodiment, restore module 230 first restores a database server tier (or other tier that does not depend on any other tier). Restore module 230 may then restore an application server tier (or other tier that depends on the already restored tier). Restore module 230 may then restore a web server tier (or other tier that depends on the second restored tier). At this stage, the multi-tiered application may be fully restored. Note that the multi-tier application may include more or fewer than three tiers. A three tiered application is merely a common example of a multi-tiered application that is provided herein.

In one embodiment, backup agent 200 includes a user interface 215. The user interface 215 may be a graphical user interface, command line user interface, or other user interface that enables a user to configure the backup policy. Users may, for example, adjust backup policies, control the format of backup data, adjust the location to which data will be backed up, and so on.

FIGS. 3-6 are flow diagrams of some embodiments of methods performed by a computing device. The methods are performed by processing logic that may comprise hardware (circuitry, dedicated logic, etc.), software (such as is run on a general purpose computer system or a dedicated machine), or a combination of both. In one embodiment, at least some operations of the methods are performed by a backup agent and/or backup server, as described in FIG. 2.

Figure 3:
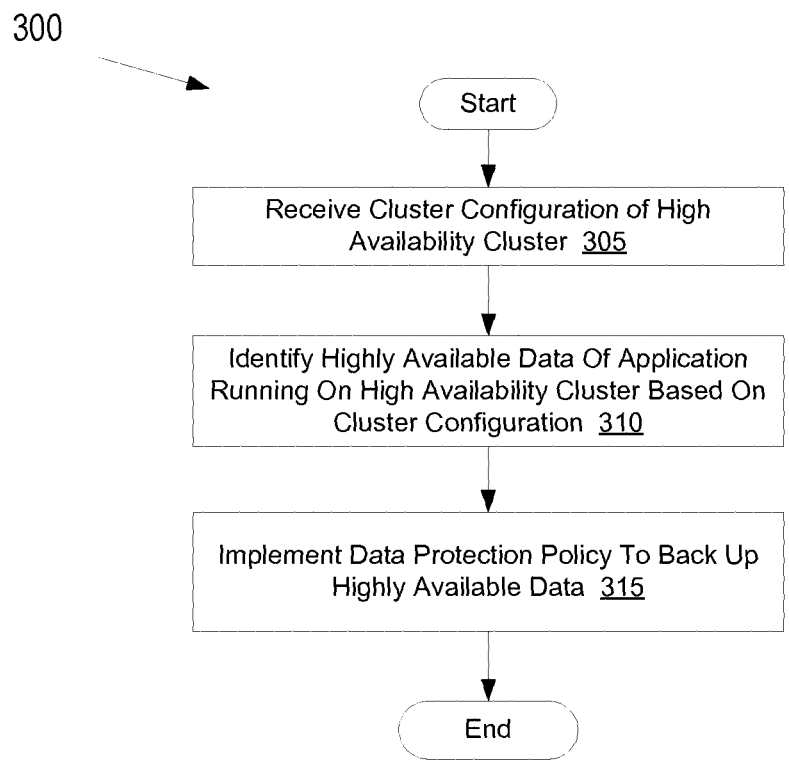
FIG. 3 is a flow diagram of one embodiment of a method for generating a backup policy and backing up highly available data.

FIG. 3 is a flow diagram of one embodiment of a method 300 for generating a backup policy and backing up highly available data. At block 305 of method 300, processing logic receives a cluster configuration of a high availability cluster. The cluster configuration may be received in response to querying a high availability agent and/or high availability server.

At block 310, processing logic identifies high availability data of an application running on the high availability cluster based on the cluster configuration. The high availability data may be data at a data source that has high availability, such as a shared storage or shared file system, or a storage area that is replicated between nodes of the high availability cluster, for example.

At block 315, processing logic implements a data protection policy to backup up the high availability data. This may include generating a backup policy based on the received cluster configuration. The backup policy may specify data sources to back up, a backup schedule and a backup data store (or data stores) to backup the highly available data to.

Figure 4:
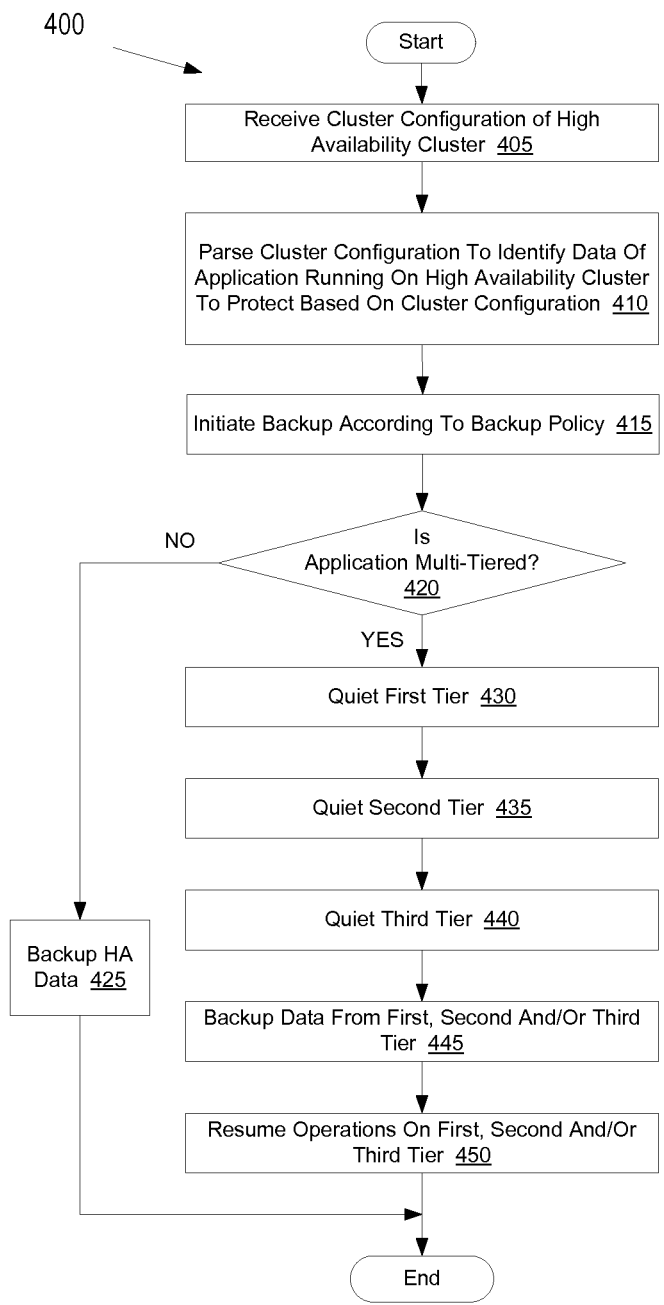
FIG. 4 is a flow diagram of another embodiment of a method for generating a backup policy and backing up highly available data.

FIG. 4 is a flow diagram of another embodiment of a method 400 for generating a backup policy and backing up highly available data. At block 405 of method 400, processing logic receives a cluster configuration of a high availability cluster. At block 410, processing logic parses the cluster configuration to identify high availability data of an application running on the high availability cluster based on the cluster configuration. The high availability data may be data at a data source that has high availability, such as a shared storage or shared file system, or a storage area that is replicated between nodes of the high availability cluster, for example. Processing logic may then generate a backup policy to protect the highly available data. This backup policy may be generated based on the cluster configuration, and without user input.

At block 415, processing logic initiates a backup according to the backup policy. At block 420, processing logic determines whether the application whose data is to be backed up is a multi-tiered application. If the application is not a multi-tiered application, then the method proceeds to block 425, and processing logic backs up highly available data from a data source specified in the backup policy. If the application is a multi-tiered application, then processing logic may perform a multi-step backup process to ensure that backed up copy is consistent. Accordingly, in such an instance, the method continues to block 430.

At block 430, processing logic quiets a first tier of the multi-tier application. The first tier may be a tier that no other tiers depend on. A common first tier is a web server tier. Quieting the first tier may include blocking all requests, queries, accesses, etc. to the first tier and flushing contents of the first tier's memory to permanent storage and/or to other tiers. Blocked requests, accesses, queries, etc. may be stored in a queue, and may be processed by the first tier after the backup is complete.

At block 435, after the first tier is quiet, processing logic quiets a second tier. The second tier may be a tier that is depended upon by the first tier. A common second tier is an application server tier. Quieting the second tier may include flushing contents of the second tier's memory to permanent storage and/or to a subsequent tier.

At block 440, after the second tier is quiet, processing logic quiets a third tier. The third tier may be a tier that is depended upon by the second tier and/or the first tier. One common third tier is a database server tier. Note that more or fewer than three tiers may also be used. Three tiers are merely provided herein as an example. Quieting the third tier may include flushing contents of the third tier's memory to permanent storage.

At block 445, after all tiers have been quieted, processing logic backs up data from the first tier, second tier and/or third tier to a backup data store. At block 450, after the data has been backed up, processing logic resumes operations of the first tier, second tier and third tier. This may include sending any requests, access attempts, queries, etc. sent to the first tier while the backup was being performed, which may be stored in a queue. The method then ends.

Figure 5:
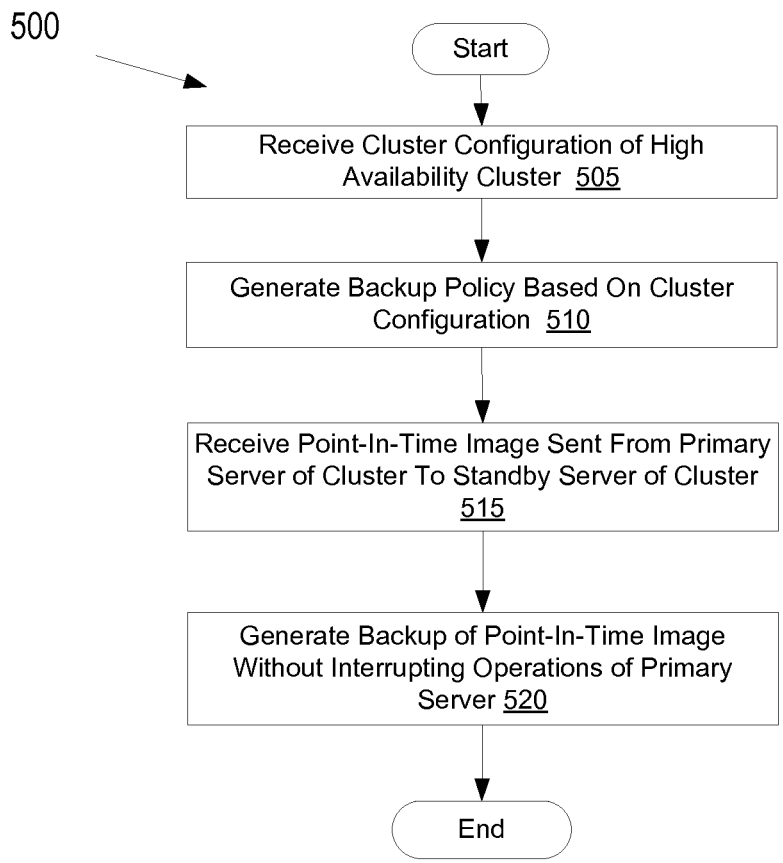
FIG. 5 is a flow diagram of yet another embodiment of a method for generating a backup policy and backing up highly available data.

FIG. 5 is a flow diagram of yet another embodiment of a method 500 for generating a backup policy and backing up highly available data. At block 505 of method 500, processing logic receives a cluster configuration of a high availability cluster. At block 510, processing logic generates a backup policy based on the cluster configuration. The cluster configuration may identify a primary server of a cluster and one or more standby servers of the cluster. The cluster configuration may further indicate that the primary server generates point-in-time images (e.g., snapshots) and sends these to the standby servers to keep the standby servers synchronized with the primary server.

At block 515, processing logic receives a point-in-time image that has been sent from the primary server to a standby server. At block 520, processing logic generates a backup of the point-in-time image based on the backup policy. Processing logic may run on the same machine as a standby server, and may retrieve a copy of the point-in-time image from the standby server. Accordingly, processing logic may generate the backup without interrupting operations of the primary server.

Figure 6:
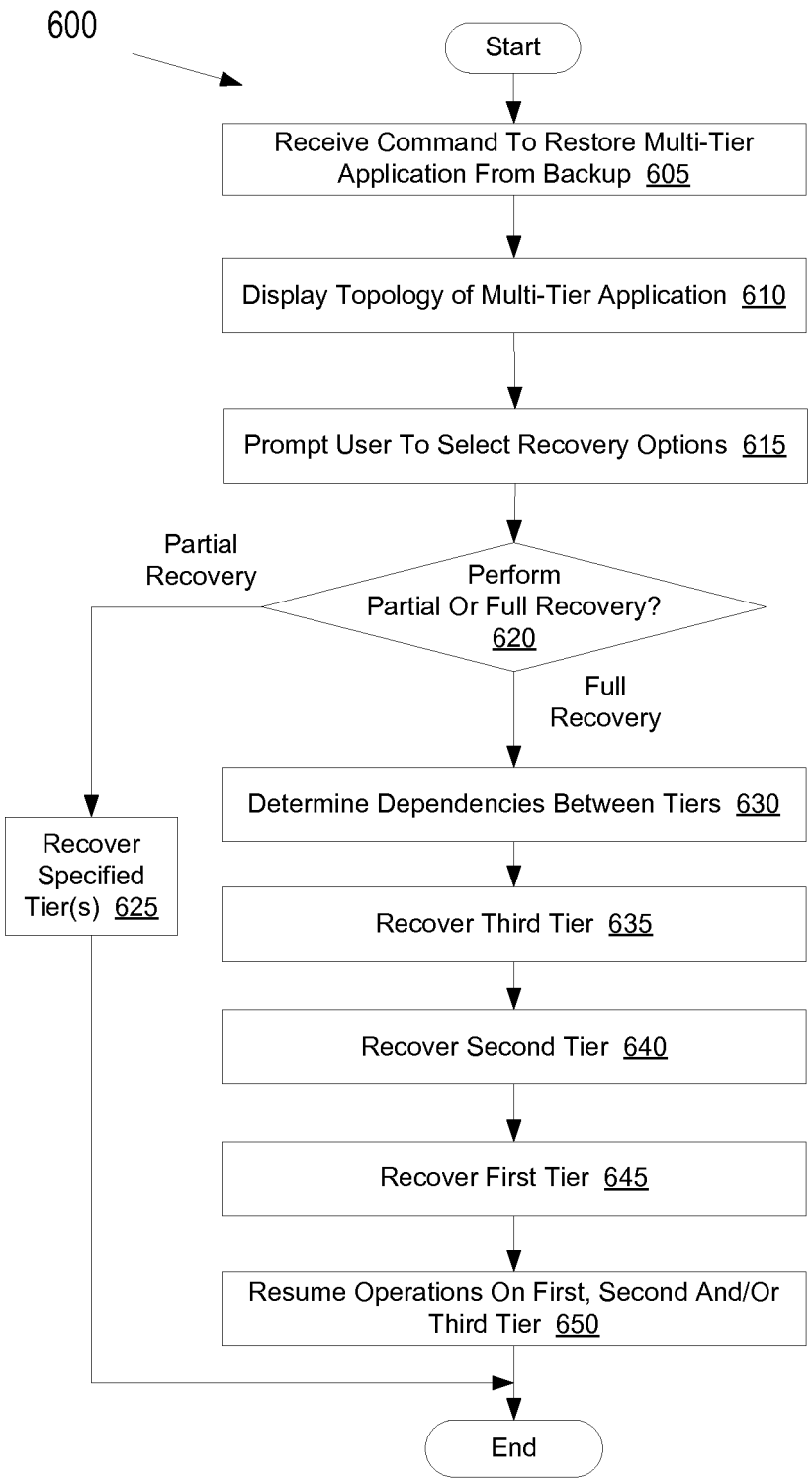
FIG. 6 is a flow diagram of one embodiment of a method for recovering an application from a backup.

FIG. 6 is a flow diagram of one embodiment of a method 600 for recovering an application from a backup via a guided recovery process. At block 605 of method 600, processing logic receives a command to restore a multi-tier application from a backup. At block 610, processing logic displays a topology of the multi-tier application. This topology may have been determined based on a cluster configuration that was used to generate a backup policy, and may be stored in metadata associated with the backup. The topology may show the number of tiers included in the multi-tier application, dependencies between the tiers, numbers of nodes included in each tier, and so on. For example, the topology may show that the multi-tiered application has four web servers, five application servers and two database servers.

At block 615, processing logic prompts a user to select one or more recovery options. The user may select to recover just one tier, particular data from a single tier, multiple tiers, all tiers, specific data from multiple tiers, etc. Alternatively, blocks 610 and 615 may be skipped, and processing logic may automatically recover the entire multi-tiered application or part of the multi-tiered application (e.g., just a database server). At block 620, processing logic determines whether a full recovery or a partial recovery is to be performed. If a partial recovery is to be performed, the method proceeds to block 625, and processing logic recovers one or more specified tiers. If a full recovery is to be performed, the method continues to block 630.

At block 630, processing logic determines dependencies between the tiers. This information may be included in the application topology information stored in metadata. At block 635, processing logic recovers a third tier (a tier that does not depend on any other tiers). One example of the third tier is a database tier. At block 640, processing logic recovers a second tier, which depends on the third tier. one example of a second tier is an application server tier. At block 645, processing logic recovers a first tier, which depends on the second tier. one example of the first tier is a web server tier. Note that more or fewer than three nodes may be recovered, depending on the topology of the multi-tiered application. At block 650, processing logic resumes operations of the first, second and third tiers. The method then ends.

Figure 7:
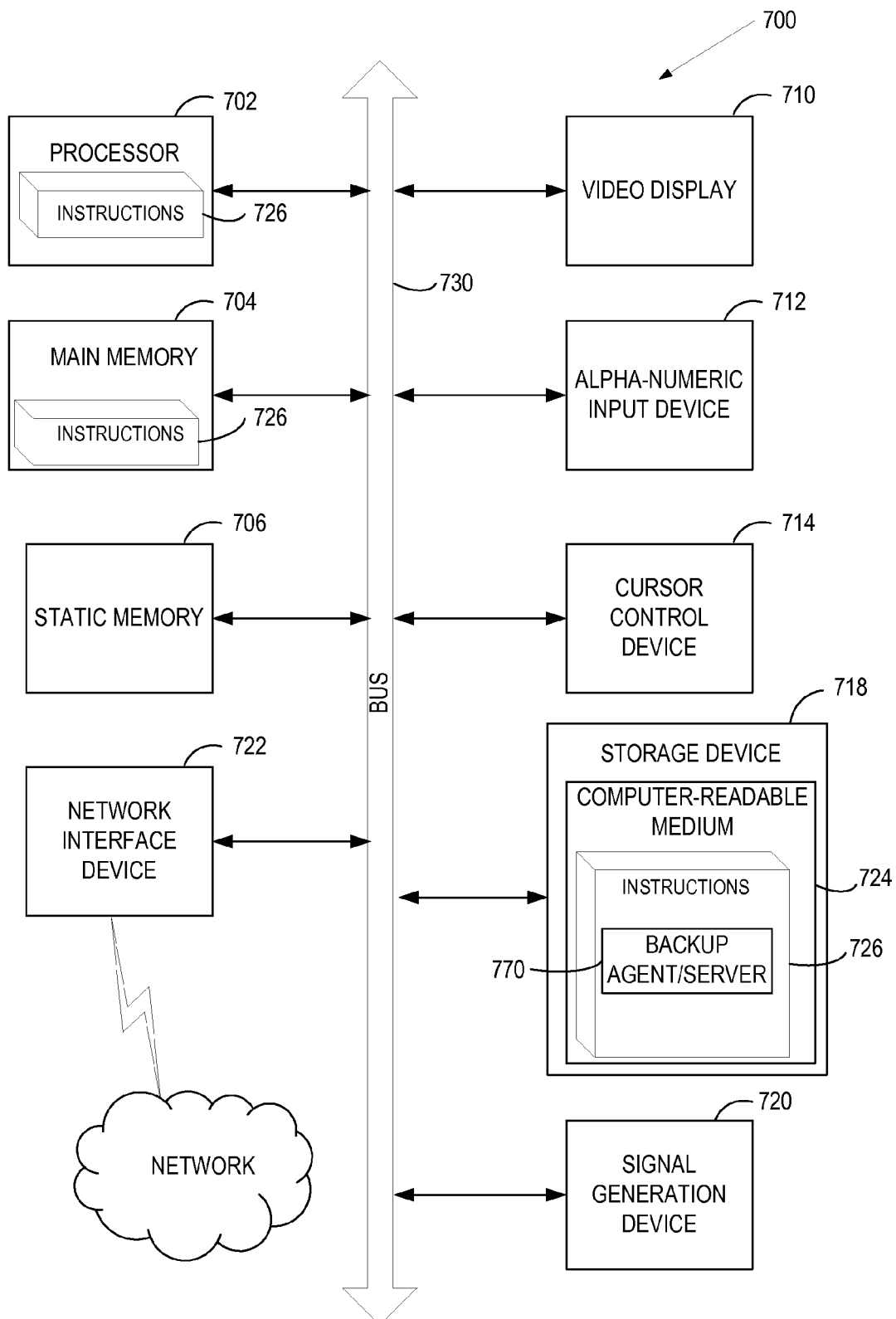
FIG. 7 is a block diagram of an exemplary computer system that may perform one or more of the operations described herein.

FIG. 7 illustrates a diagrammatic representation of a machine in the exemplary form of a computer system 700 within which a set of instructions, for causing the machine to perform any one or more of the methodologies discussed herein, may be executed. For example, the computer system 700 may be a node in a high availability cluster. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processing device (processor) 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions 726 for performing the operations and steps discussed herein.

The computer system 700 may further include a network interface device 722. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 718 may include a computer-readable storage medium 724 on which is stored one or more sets of instructions 726 (e.g., software) embodying any one or more of the methodologies or functions described herein. The instructions 726 may also reside, completely or at least partially, within the main memory 704 and/or within the processor 702 during execution thereof by the computer system 700, the main memory 704 and the processor 702 also constituting computer-readable storage media. The instructions 726 may further be transmitted or received over a network 774 via the network interface device 822.

In one embodiment, the instructions 826 include instructions for a backup agent and/or backup server 770, such as backup agent or server 200 of FIG. 2, and/or a software library containing methods that call a backup agent or backup server. While the computer-readable storage medium 824 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

While the computer-readable storage medium may be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

It is to be understood that the above description is intended to be illustrative, and not restrictive. Many other embodiments will be apparent to those of skill in the art upon reading and understanding the above description.

What is claimed is:
1. A method comprising:
receiving, by a data protection agent or server running on a computing device, a cluster configuration of a high availability cluster, the cluster configuration indicating highly available data, specified by a first administrator, of a multi-tiered application running on the high availability cluster, the high availability cluster comprising a plurality of clusters corresponding to tiers of the multi-tiered application;

parsing, by the data protection agent or server, the cluster configuration to identify the highly available data residing on the plurality of clusters corresponding to the tiers of the multi-tiered application;

providing information indicating the identified highly available data to back up to a second administrator having no information of the highly available data to be backed up; and implementing a data protection policy to back up the highly available data based on the information.

2. The method of claim 1, wherein the computing device is a node in the high availability cluster, the method further comprising:

backing up the highly available data to a storage device at a time specified in the data protection policy.

3. The method of claim 1, further comprising:

quieting a first tier of the multi-tiered application, wherein the quieting of the first tier comprises blocking access to the first tier and sending contents of a first memory at the first tier to a second memory at a second tier of the multi-tiered application that is depended on by the first tier;

quieting the second tier of the multi-tiered application, wherein the quieting of the second tier comprises writing contents of the second memory at the second tier to a permanent storage; and backing up the highly available data from the permanent storage.

4. The method of claim 1, wherein the multi-tiered application comprises a web server tier corresponding to a first tier of the multi-tiered application, an application server tier corresponding to a second tier of the multi-tiered application, and a database tier.

5. The method of claim 1, further comprising:

identifying a first subset of the highly available data associated with a first tier of the multi-tiered application and a second subset of the highly available data associated with a second tier of the multi-tiered application;

recording in metadata that the first subset is associated with the first tier and that the second subset is associated with the second tier; and storing the first subset, the second subset and the metadata in a backup storage device.

6. The method of claim 5, further comprising recovering the multi-tiered application, the recovering comprising:

recovering the second tier based on the second subset; and subsequently recovering the first tier based on the first subset.

7. The method of claim 1, further comprising:

identifying, based on the cluster configuration, a primary server and a standby server of the high availability cluster; and backing up the highly available data from the standby server without interrupting operations of the primary server.

8. The method of claim 7, wherein backing up the highly available data from the standby server comprises:

determining that the standby server has received a point-in-time image from the primary server, the point-in-time image containing the highly available data; and generating a backup of the point-in-time image.

9. The method of claim 1, further comprising:

querying the high availability cluster for the cluster configuration via at least one of a command line interface of the high availability cluster, a web service of the high availability cluster or an application programming interface of the high availability cluster.

10. A non-transitory computer readable storage medium including instructions that, when executed by a processing device, cause the processing device to perform operations comprising:

receiving, by a data protection agent or server executed by the processing device, a cluster configuration of a high availability cluster, the cluster configuration indicating highly available data, specified by a first administrator, of a multi-tiered application running on the high availability cluster, the high availability cluster comprising a plurality of clusters corresponding to tiers of the multi-tiered application;

parsing, by the data protection agent or server, the cluster configuration to identify the highly available data residing on the plurality of clusters corresponding to the tiers of the multi-tiered application;

providing information indicating the identified highly available data to back up to a second administrator having no information of the highly available data to be backed up; and implementing a data protection policy to back up the highly available data based on the information.

11. The non-transitory computer readable storage medium of claim 10, wherein the computing device is a node in the high availability cluster, the operations further comprising:

backing up the highly available data to a storage device at a time specified in the data protection policy.

12. The non-transitory computer readable storage medium of claim 10, wherein the multi-tiered application comprises at least a first tier and a second tier that is depended on by the first tier, the operations further comprising:

quieting the first tier, wherein the quieting of the first tier comprises blocking access to the first tier and sending contents of a first memory at the first tier to a second memory at a second tier of the multi-tiered application that is depended on by the first tier;

quieting the second tier, wherein the quieting of the second tier comprises writing contents of the second memory at the second tier to a permanent storage; and backing up the highly available data from the permanent storage.

13. The non-transitory computer readable storage medium of claim 10, wherein the multi-tiered application comprises a web server tier corresponding to the first tier, an application server tier corresponding to the second tier, and a database tier.

14. The non-transitory computer readable storage medium of claim 10, the operations further comprising:

identifying a first subset of the highly available data associated with a first tier of the multi-tiered application and a second subset of the highly available data associated with a second tier of the multi-tiered application; and recording in metadata that the first subset is associated with the first tier and that the second subset is associated with the second tier; and storing the first subset, the second subset and the metadata in a backup storage device.

15. The non-transitory computer readable storage medium of claim 14, the operations further comprising recovering the multi-tiered application, the recovering comprising:

recovering the second tier based on the second subset; and subsequently recovering the first tier based on the first subset.

16. The non-transitory computer readable storage medium of claim 10, wherein implementing the data protection policy comprises:

identifying, based on the cluster configuration, a primary server and a standby server of the high availability cluster; and backing up the highly available data from the standby server without interrupting operations of the primary server, wherein the backing up comprises:

determining that the standby server has received a point-in-time image from the primary server, the point-in-time image containing the highly available data; and generating a backup of the point-in-time image.

17. The non-transitory computer readable storage medium of claim 10, the operations further comprising:

querying the high availability cluster for the cluster configuration via at least one of a command line interface of the high availability cluster, a web service of the high availability cluster or an application programming interface of the high availability cluster.

18. An apparatus comprising:

a memory to store instructions for a backup agent or backup server; and a processing device, coupled to the memory, to execute the instructions, wherein the processing device is configured by the instructions to:

receive a cluster configuration of a high availability cluster, the cluster configuration indicating highly available data, specified by a first administrator, of a multi-tiered application running on the high availability cluster, the high availability cluster comprising a plurality of clusters corresponding to tiers of the multi-tiered application;

parse the cluster configuration to identify the highly available data residing on the plurality of clusters corresponding to the tiers of the multi-tiered application;

provide information indicating the identified highly available data to back up to a second administrator having no information of the highly available data to be backed up; and implement a data protection policy to back up the highly available data based on the information.

19. The apparatus of claim 18, wherein the processing device is further to:

quiet the first tier, wherein to quiet first tier comprises the processing device to block access to the first tier and send contents of a first memory at the first tier to a second memory at a second tier of the multi-tiered application that is depended on by the first tier;

quiet the second tier, wherein to quiet the second tier comprises the processing device to write contents of the second memory at the second tier to a permanent storage; and back up the highly available data from the permanent storage.

* * * * *